(12) United States Patent
Buford

(10) Patent No.: US 11,100,453 B2
(45) Date of Patent: Aug. 24, 2021

(54) AGENT INTERACTION DURING OPERATION OF AN UNMANNED DELIVERY SERVICE

(71) Applicant: Avaya Inc., Basking Ridge, NJ (US)

(72) Inventor: John F. Buford, Princeton, NJ (US)

(73) Assignee: AVAYA INC., Basking Ridge, NJ (US)

( * ) Notice: Subject to any disclaimer, the term of this patent is extended or adjusted under 35 U.S.C. 154(b) by 963 days.

(21) Appl. No.: 14/794,372

(22) Filed: Jul. 8, 2015

(65) Prior Publication Data

US 2017/0011339 A1 Jan. 12, 2017

(51) Int. Cl.
*G06Q 10/08* (2012.01)
*H04N 5/77* (2006.01)

(52) U.S. Cl.
CPC .... *G06Q 10/0835* (2013.01); *B64C 2201/128* (2013.01); *H04N 5/77* (2013.01)

(58) Field of Classification Search
CPC .. G06Q 10/08; G06Q 30/016; G06Q 10/0631; G06Q 10/083; G06Q 10/0833; G06Q 10/0835
USPC ......................................................... 705/336
See application file for complete search history.

(56) References Cited

U.S. PATENT DOCUMENTS

| | | | |
|---|---|---|---|
| 6,985,576 B1 * | 1/2006 | Huck | H04M 3/5191 370/352 |
| 8,612,272 B1 * | 12/2013 | Aykin | G06Q 10/063 705/7.11 |
| 9,747,901 B1 * | 8/2017 | Gentry | G10L 15/22 |
| 2010/0246800 A1 * | 9/2010 | Geppert | G06F 3/04817 379/265.09 |
| 2015/0106291 A1 * | 4/2015 | Robinson | G06F 21/62 705/339 |
| 2016/0068264 A1 * | 3/2016 | Ganesh | G08G 5/0069 701/2 |

FOREIGN PATENT DOCUMENTS

WO    WO-0111523 A1 *   2/2001   ............. G06Q 30/06

OTHER PUBLICATIONS

He et al., "FlyingBuddy: Augment Human Mobility and Perceptibility", UbiComp'11: Proceedings of the 13th international conference on Ubiquitous computing, Sep. 2011, pp. 615-616 (Year: 2011).*

* cited by examiner

*Primary Examiner* — Emmett K. Walsh

(57) ABSTRACT

Embodiments disclosed herein provide systems, methods, and computer readable media for providing agent interaction during item delivery in an unmanned delivery service. In a particular embodiment, a method provides determining that a first agent of a contact center should communicate through an unmanned delivery device at a first delivery location, wherein the unmanned delivery device transports a first item for delivery to the first delivery location. The method further provides connecting a first client system operated by the first agent to the unmanned delivery device when the unmanned delivery device is at the first delivery location and exchanging communications for the agent between the first client system and the unmanned delivery device.

20 Claims, 7 Drawing Sheets

AGENT INTERACTION DURING OPERATION OF AN UNMANNED DELIVERY SERVICE

TECHNICAL FIELD

Aspects of the disclosure are related to the operation of a delivery service using unmanned delivery devices and, in particular, to allowing an agent to communicate through an unmanned delivery device.

TECHNICAL BACKGROUND

Some modern vehicles are capable of moving around without the need to have a person on board directing the vehicle. These vehicles may be remotely controlled by a person or may be more autonomous with little to no input from a human operator. The vehicles may operate on land, in air, in water, or in space. The lack of a person onboard allows unmanned vehicles to be designed without having to consider the needs of a human operator. For example, a vehicle may be smaller than necessary to carry a person. Benefits of unmanned vehicles may include lower costs due to the removal of the human element, removal of at least some possibility for human error, or tasks that vehicles having a human operator would not be able to perform or would otherwise be dangerous to perform.

Recently, it has been proposed to use unmanned vehicles to deliver items to customers. In particular, the use of aerial vehicles, sometimes referred to as drones, could cut down on delivery times by being able to move faster and avoid slowdowns caused by traffic, stoplights, etc. While at least these benefits may exist for such a delivery service, an unmanned delivery vehicle does not have much capability beyond simply dropping off items. Thus, if there are any issues that need to be resolved with a delivery, a receiver at the delivery location is not able to interact with the delivery vehicle in the same way he or she could with a human.

OVERVIEW

Embodiments disclosed herein provide systems, methods, and computer readable media for providing agent interaction during item delivery in an unmanned delivery service. In a particular embodiment, a method provides determining that a first agent of a contact center should communicate through an unmanned delivery device at a first delivery location, wherein the unmanned delivery device transports a first item for delivery to the first delivery location. The method further provides connecting a first client system operated by the first agent to the unmanned delivery device when the unmanned delivery device is at the first delivery location and exchanging communications for the agent between the first client system and the unmanned delivery device.

In some embodiments, exchanging the communications comprises, in the first client system, receiving video captured of the first delivery location by the unmanned delivery device and displaying the video to the first agent.

In some embodiments, exchanging the communications comprises, from the first client system, transferring audio captured of the first agent to the unmanned delivery device for presentation at the first delivery location by the unmanned delivery device.

In some embodiments, exchanging the communications further comprises, from the first client system, transferring video captured of the first agent in conjunction with the audio to the unmanned delivery device for display at the first delivery location by the unmanned delivery device.

In some embodiments, exchanging the communications comprises, in the first client system, receiving information from the unmanned delivery device and using the information to validate that a person at the first delivery location is authorized to receive the first item. Upon validating the person, the method provides transferring a signal from the first client system to the unmanned delivery device instructing the unmanned delivery device to release the first item to the person.

In some embodiments, the method further provides receiving input from the first agent into the first client system instructing that communications be exchanged between the unmanned delivery device and a second client system operated by a second agent and connecting the second client system to the unmanned delivery device.

In some embodiments, determining that the first agent of the contact center should communicate through the unmanned delivery device at the first delivery location comprises identifying a plurality of items, including the first item, for delivery via a plurality of unmanned delivery devices, including the first unmanned delivery device, to a plurality of delivery locations, including the first delivery location, and scheduling a plurality of agents, including the first agent, such that an agent of the plurality of agents is able to communicate at each of the plurality of delivery locations.

In some embodiments, scheduling the plurality of agents comprises distributing delivery times for each of the plurality of items such that the number of items being delivered at any one time does not exceed the number of agents in the plurality of agents.

In some embodiments, the unmanned delivery device is not steered to the first delivery location by the first agent.

In some embodiments, the unmanned delivery device comprises an aerial drone.

In another embodiment, a client system operated by a first agent of a contact center for an unmanned delivery service is provided. The client system includes a communication interface configured to connect to an unmanned delivery device when the unmanned delivery device is at a first delivery location in response to a delivery management system determining that the first agent should communicate through the unmanned delivery device at the first delivery location. The unmanned delivery device transports a first item for delivery to the first delivery location. The communication interface is further configured to exchange communications for the agent with the unmanned delivery device.

In yet another embodiment, a delivery management system for facilitating an unmanned delivery service is provided. The delivery management system includes a processing system configured to determine that a first agent of a contact center should communicate through an unmanned delivery device at a first delivery location. The unmanned delivery device transports a first item for delivery to the first delivery location. The delivery management system further includes a communication interface configured to connect a first client system operated by the first agent to the unmanned delivery device when the unmanned delivery device is at the first delivery location. Communications are then exchanged for the agent between the first client system and the unmanned delivery device.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

While unmanned vehicles are capable of delivering items to various locations, the vehicles are not able to provide additional support to the delivery. In fact, even if a delivery vehicle is operated by a human operator as opposed to being autonomous, the human operator may not have the proper expertise or may not otherwise be capable of assisting a person receiving an item at a delivery location. Accordingly, the unmanned delivery devices described herein are unmanned delivery vehicles that are connected to remote client systems with human operators. These human operators are described as agents in that they are trained to handle issues involved with the delivery of items. For example, the agents may represent a retailer that sold a delivered item, a manufacturer of a delivered item, or are otherwise qualified to assist with the item in some other manner. By being connected to the delivery device through their client systems, the agents may be able to confirm delivery of an item, address concerns about the item from a person at the delivery location, answer questions about the item from a person at the delivery location, verify the identity of a person receiving the item, or perform any other function that can be handled remotely by such an agent.

Figure 1:
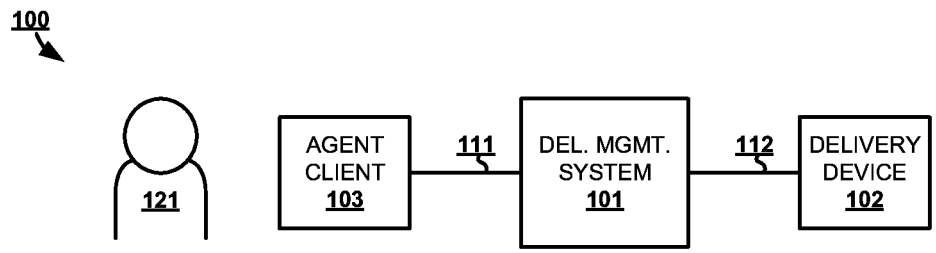
FIG. 1 illustrates an unmanned delivery environment for providing agent interaction during item delivery.

FIG. 1 illustrates unmanned delivery environment 100 for providing agent interaction during item delivery. Unmanned delivery environment 100 includes delivery management system 101, unmanned delivery device 102, and agent client system 103, which is operated by agent 121. Delivery management system 101 and agent client system 103 communicate over communication link 111. Delivery management system 101 and unmanned delivery device 102 communicate over wireless link 112.

In operation, unmanned delivery device 102 is a delivery vehicle that travels via land, sea, air, or space. For example, device 102 may be a driverless delivery van, flying drone, or some other type of vehicle. Though not shown, unmanned delivery device 102 may be piloted (e.g. steered, flown, etc.) by an operator other than agent 121. Alternatively, device 102 may be autonomous and merely require information identifying a delivery location (e.g. delivery address) before piloting itself to that location. Thus, regardless of how device 102 is piloted, when an item is placed in, attached to, or otherwise positioned (e.g. by an employee at a distribution center) for transport by device 102, unmanned delivery device 102 is configured to deliver the item to a delivery location.

Figure 2:
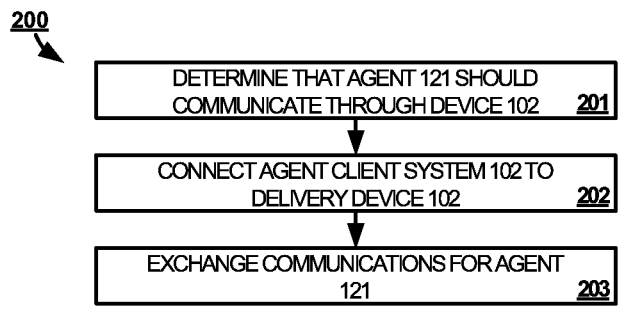
FIG. 2 illustrates a method of operating the unmanned delivery environment to provide agent interaction during item delivery.

FIG. 2 illustrates a method 200 for operating unmanned delivery environment 100 to provide agent interaction during item delivery. In method 200, unmanned delivery device 102 transports an item for delivery to a delivery location. Method 200 provides determining that an agent 121 of a contact center should communicate through unmanned delivery device 102 at the delivery location (step 201). This determination may be made by delivery management system 101 at or around the time the communication should start (e.g. when device 102 is at the delivery location). Alternatively, the communication with agent 121 may be scheduled ahead of time, which would ensure an agent is available for delivery of the item. For example, the item may be one of many items for delivery by device 102 during a certain time period. System 101 may therefore determine when device 102 will be at each delivery location and schedule agent 121 (and any other agents that may be available) in accordance with that determination.

Method 200 then provides connecting client system 103 operated by agent 121 to unmanned delivery device 102 when the unmanned delivery device is at the delivery location (step 202). Delivery management system 101 may determine that unmanned delivery device 102 is at the delivery location by receiving location information from device 102 (e.g. Global Positioning System coordinates), by receiving notification from delivery device 102 indicating that device 102 is at the delivery location, by receiving information about delivery device 102's location from other systems (e.g. cellular towers, satellite links, etc.), or in some other manner. Unmanned delivery device 102 may be considered to be at the delivery location when device 102 is within a set distance (e.g. 200 yards) of the delivery location, when device 102 has come to a stop at the delivery location, when device 102 detects that a person is at the delivery location, or any other criteria that would indicate that unmanned delivery device 102 is near enough to the delivery location to warrant a connection with client 103.

Once agent client system 103 is connected to delivery device 102, method 200 provides exchanging communications for the agent between client system 103 and unmanned delivery device (step 203). The communications may pass through delivery management system 101 as illustrated in FIG. 1 or may be routed without system 101 in the communication path, as may be the case if at step 201 delivery management system 101 connects client 103 and device 102 by instructing one or both of elements 103 and 102 to initiate communications with the other. The communications exchanged may be one-way to agent client system 103 from delivery device 102 or may be two-way. Moreover, the communications may be some combination of audio or video. Therefore, in some examples, agent 121 may only be able to see or hear video and audio captured by unmanned delivery device 102 while, in other examples, agent 121 may be able to communicate to a person located at the delivery location.

The communications exchanged above allow agent 121 to perform a variety of functions that the unmanned delivery device 102 could not otherwise perform on its own. These functions include delivery confirmation, receiver identity validation, item returns, answering questions about the delivered items, addressing complaints from a receiver, calling the receiver to follow up on the delivery, or any other function that a human may remotely perform.

Referring back to FIG. 1, delivery management system 101 comprises a computer processor system and communication interface. Delivery management system 101 may also include other components such as a router, server, data storage system, and power supply. Delivery management system 101 may reside in a single device or may be distributed across multiple devices. While shown separately, the functionality of delivery management system 101 may be incorporated into agent client system 103. Delivery management system 101 may be a communication server, videoconferencing system, call routing system, application server, personal computer workstation, network gateway system, or some other computing system—including combinations thereof.

Unmanned delivery device 102 includes a computer processor system and a wireless communication interface. Unmanned delivery device 102 further includes elements to move device 102, which may include one or more motors, propellers, wheels, servos, or some other element that may be used to propel or direct device 102—including combinations thereof. Unmanned delivery device 102 may also include one or more microphones, cameras, speakers, displays, or some other element that may be used to exchange communications between agent 121 and a person at a delivery location—including combinations thereof. Unmanned delivery device 102 may be a rolling delivery vehicle (e.g. cart, van, etc.), an aerial vehicle (e.g. airplane, rotary-wing aircraft, etc.), a water vehicle (e.g. boat, submarine, etc.), or some other type of vehicle.

Agent client system 103 comprises a computer processor system and communication interface. Agent client system 103 may also include other components such as a router, server, data storage system, and power supply. Agent client system 103 may reside in a single device or may be distributed across multiple devices. In some cases, agent client system 103 includes a video camera so that video views can be captured and controlled at client 103 in the same manner described for system 101 and camera 102 herein. Alternatively, client 103 may be a more traditional videoconferencing client without the view control functionality. Agent client system 103 may be a telephone, computer, tablet, conference room system, e-book, mobile Internet appliance, network interface card, media player, game console, application server, proxy server, or some other communication apparatus—including combinations thereof.

Wireless link 112 uses the air or space as the transport media. Wireless link 112 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 111 uses metal, glass, air, space, or some other material as the transport media. Communication link 111 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 111-112 could be direct links or may include intermediate networks, systems, or devices.

Figure 3:
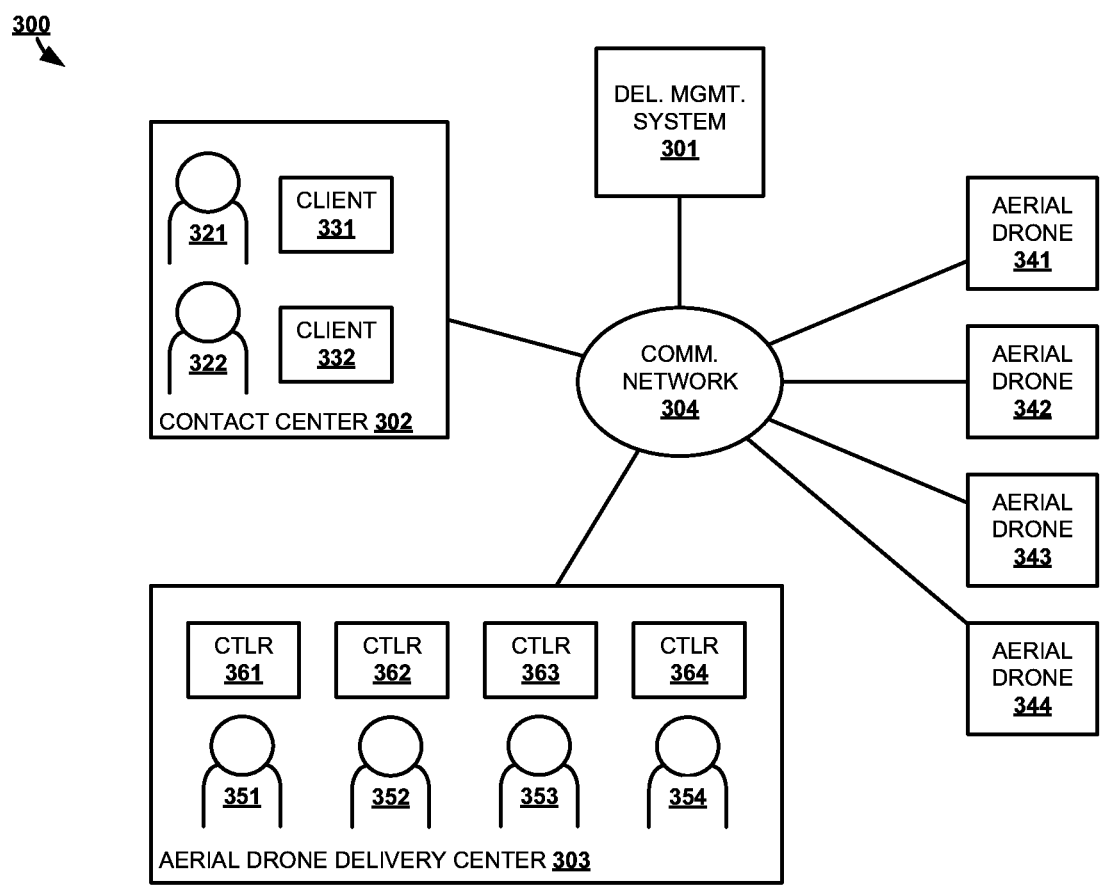
FIG. 3 illustrates an unmanned delivery environment for providing agent interaction during item delivery.

FIG. 3 illustrates unmanned delivery environment 300 for providing agent interaction during item delivery. Unmanned delivery environment 300 includes delivery management system 301, contact center 302, aerial drone delivery center 303, communication network 304, and aerial drones 341-344. Contact center 302 includes agent client systems 331-332 and agents 321-322. Aerial drone delivery center 303 includes drone control systems 361-364 and drone pilots 351-354.

In this example, unmanned areal drones 341-344 are used to delivery items. The items may be provided to each drone for delivery at delivery center 303 or at some other distribution center, store, or location. Each drone may have an item carrying bay, item holding clamps, or some other means of securing items to the drone. Drones 341-344 are remotely piloted by pilots 351-354, respectively, using drone control systems 361-364. Drone control systems 361-364 may include joysticks, display screens, or other elements that may be used by pilots 351-354 to remotely pilot an aircraft. Control signals from control systems 361-364 are transferred over communication network 304, which may include one or more local area networks (LANs), wide area networks (WANs), the Internet, cellular wireless base stations, or some other type of communication network that allows wireless communication with drones 341-344—including combinations thereof. Alternatively, communication network 304 may include more proprietary wireless links, such as satellite connections, for communicating with drones 341-344.

Delivery management system 301 is configured to schedule agents for communicating through drones 341-344 when they are at delivery locations. Since the agent pool in this example is less than the number of drones 341-344, delivery managements system 301 coordinates agents 321-322 with the deliveries so that an agent is available whenever a drone is at a delivery location. However, it should be understood that any ratio of agents to drones may be accounted for by delivery management system 301.

Additionally, while agents 321-322 are shown as part of contact center 302, contact center 302 may be a distributed contact center that allows agent to be at different physical locations, such as home offices. Aerial drone delivery center 303 may be similarly configured to allow pilots 351-354 to work from different locations. Likewise, while shown as an independent system, delivery management system 301 may be part of contact center 302 or delivery center 303.

Figure 4:
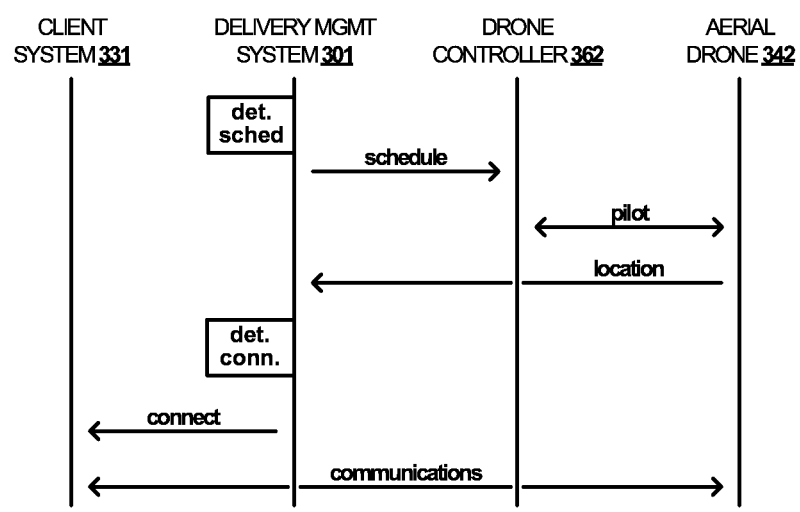
FIG. 4 illustrates an example operation of the unmanned delivery environment to provide agent interaction during item delivery.

FIG. 4 illustrates operation sequence 400 for operating unmanned delivery environment 300 to provide agent interaction during item delivery. In this example, delivery management system 301 determines a schedule for agents 321 and 322 to communicate through drones 41-344. The agent's schedule may be based on an already generated delivery schedule for items being delivered by drones 341-344, which may be generated by system 301 or some other system. Alternatively, delivery management system 301 may be able to schedule the timing of the item deliveries as well in order to coordinate all the delivery operations. Delivery management system 301 may take into account the time it takes for drones 341-344 to reach individual delivery locations, estimated time at each location, which may be based on an estimated length of agent/receiver interaction, drone downtime to recharge/refuel or pick up additional delivery items, or some other factor that could effect drone delivery timing.

The schedule is configured such that an agent of agents 321-322 will be available (or will available with minimal wait time) when an item that requires or would benefit from agent interaction upon delivery arrives at a delivery location via one of drones 341-344. In some cases, an item may not have any reason to have agent interaction upon delivery.

Thus, system 301 may schedule delivery of those items during times when agents 321-322 are busy handling other item deliveries. Likewise, different items may require agents with different skill sets. For example, if a receiver has a question about the item(s) being delivered, the agent scheduled to communicate with that receiver for that item should have at least some knowledge about the item. Therefore, agent skillset may be factored into the scheduling of agents 321-322. Similarly, agents may represent different retailers, item manufacturers, or the like. Hence, for example, an agent working on behalf of one retailer should be scheduled to handle item deliveries sold by that retailer.

In operation 400, delivery management system 301 delivers the delivery schedule to delivery center 303 so that drones 341-344 can be loaded with delivery items and be piloted to delivery locations in accordance with the schedule. Operation 400 specifically focuses on the schedule as it applies to controller 362 and aerial drone 342, which is piloted by pilot 352, although a similar process is followed by each controller, drone, and pilot combination. Based on the schedule, drone 342 is loaded with at least one item for delivery to a delivery location, such as a delivery address indicated by an order for the item. Pilot 352 then pilots drone 342 to that delivery location. Pilot 352 may use a live video feed from drone 342 presented by controller 362, a map presented by controller 362 showing the location over ground of drone 342, or any other information that would assist pilot 352 when piloting drone 342 to the delivery location.

Upon reaching the delivery location, aerial drone 342 indicates to delivery management system 301 that it is at the delivery location. The indication may come directly from drone 342 upon drone 342 determining that it is at the delivery location. In some cases, this indication may come from input into controller 362 by pilot 352 indicating that drone 342 is at the delivery location. In other cases, controller 362 may automatically send the arrival indication to delivery management system 301 upon determining that location information about drone 342 indicates drone 342 is at the delivery location.

Once delivery management system 301 receives the indication that drone 342 is at the delivery location, delivery management system 301 determines to connect one of agent client systems 331-332 to aerial drone 342 to allow the agent to communicate through drone 342. In operation 400, agent 321 is to communicate through drone 342 based on the schedule determined by delivery management system 301 (i.e. agent 321 is scheduled to handle communications regarding the delivery of this item). Therefore, delivery management system 301 instructs client system 331 to connect to drone 342. In some examples, more than one agent may be available to connect to drone 342 and, therefore, system 301 may select one of those agents. Alternatively, a call distribution system for the call center may be instructed to route the connection to one of the agents.

Once connected to drone 342, client system 331 and drone 342 exchange communications for agent 321. The communications may be exchanged over the same type of channel used for piloting communications from controller 362 or may use a different channel (e.g. the piloting channel may be a proprietary wireless link while agent communications may be exchanged over a cellular wireless network). In one example of the agent communications, agent 321 may simply use a video feed received from drone 342 and displayed by client system 331 to confirm that the item is delivered to the correct location, is in good condition upon arrival, or for some other purpose that may be served by one-way video communications.

In alternative examples, real-time two-way audio or video communications may be employed to communicate with a human receiver at the delivery location. If drone 342 is equipped with a display, then live video captured by client system 331 of agent 321 may be displayed to the receiver. Otherwise, the receiver may only be able to hear audio of agent 321. These live video/audio communications allow for agent 321 to converse with the human receiver about the item delivery. For example, agent 321 can provide information about the item and either party can ask questions for answering by the other party. In some cases, another agent may be requested (e.g. if agent 321 needs to escalate a question to a supervisor agent) and agent 321 instructs client system 331 to connect the drone to another agent. The connection to the other agent (via that agent's client system) may by handled by delivery management system 301, client system 331 itself, or some other system.

During the communications, client system 331 may provide information about the item to agent 321. The information may include an identifier for the item, technical support information about the item, where the item was purchased (e.g. a particular website), information about who purchased the item, information about who is supposed to be at the delivery location to receive the item, or any other type of information that may be relevant to agent 321's communications regarding the delivered item. Likewise, agent 321 may have the ability to present some of this information to a receiver at the delivery location via a user interface on drone 342. For example, client 331 at the instruction of agent 321 may transfer information (e.g. instructions for unwrapping the item, disclaimers for the item, or other type of displayable information) for display by drone 342 to a receiver at the delivery location.

While operation 400 uses a schedule to pre-identify agents to handle item delivery communications, other examples may use a more traditional type of call center agent selection. That is, when a drone indicates to delivery management system 301 that it is at a delivery location for an item, delivery management system 301 may select an agent from an agent pool. Depending on the number of agents in the pool, without advance scheduling an appropriate agent may not be available when a drone reaches a delivery location and the drone may then have to wait at the delivery location before an agent becomes available.

Additionally, the schedule may need to be modified after its initial generation. For example, deliveries may take longer than anticipated, new items for delivery may need to be added to the schedule, drones may go out of service, incorrect delivery locations may need to be corrected, or some other occurrence happens that would prevent the initial schedule from being followed. Delivery management system 301 may therefore amend the schedule as needed and send updated schedules to delivery center 303.

Figure 5:
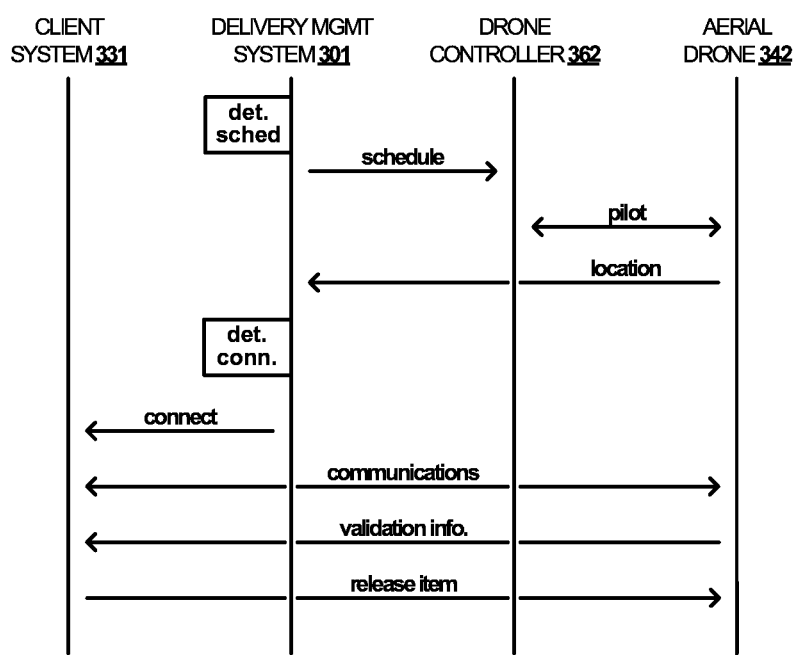
FIG. 5 illustrates an example operation of the unmanned delivery environment to provide agent interaction during item delivery.

FIG. 5 illustrates operation sequence 800 for operating unmanned delivery environment 300 to provide agent interaction during item delivery. Operation 500 progresses in the same way as operation 400 to exchange communications between client system 331 and drone 342. However, during the exchange of communications agent 321 requests information so that agent 321 can validate whether the receiver at the delivery location is allowed to receive the item. The validation information is provided to drone 342 and then transferred to client system 331 for validation.

The validation information may include a photo ID of the receiver held up to the camera of the drone, may be a password entered into a user interface on the drone, may be input into a biometric sensor on the drone (e.g. fingerprint scanner), may be a Radio Frequency Identifier (RFID) or other near field communication input into the drone, or some other type of information that may be used to validate a human receiver. Depending on the type of information client system 331 may require the assistance of another system, such as a data repository storing validation information for comparison, in order to validate the receiver at the delivery location.

If the receiver is validated, then client system 331 transfers an instruction to drone 342 to release the item to the receiver. For example, if drone 342 carries the item in a cargo bay, then drone 342 may unlock or open the cargo bay for the receiver to obtain the item. Otherwise, drone 342 will not release the item to the receiver. The instruction may be transferred in response to input from agent 321 or may be automatically transferred if agent input is not required to validate the receiver. In some cases, the connection to an agent system may not occur until drone 342 determines that a person is present at the delivery location. This determination may be made using facial recognition, motion sensors, or in some other manner.

Of course, in either of operations 400 and 500, if no person is at the delivery location when the connection with an agent is established, the agent may terminate the connection and allow drone 342 to move on to another delivery. If delivery instructions allow the item to be delivered when no one is present at the delivery location, then drone 342 may leave the item at the delivery location. Otherwise, drone 342 will not leave the item and will return the item to its source (i.e. store or distribution center) or will attempt delivery at a later time.

Figure 6:
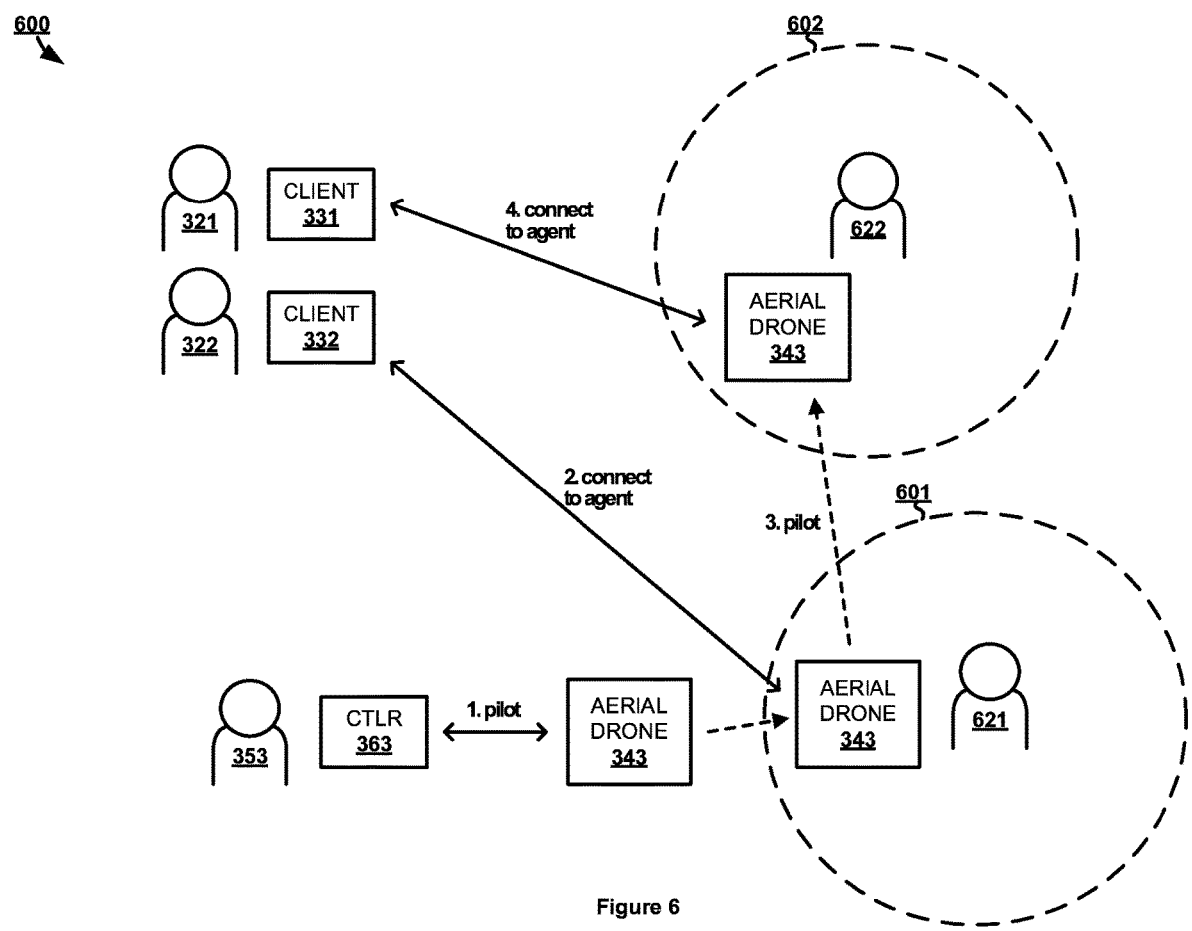
FIG. 6 illustrates an example scenario during an operation of the unmanned delivery environment to provide agent interaction during item delivery.

FIG. 6 illustrates an example scenario 600 during an operation of the unmanned delivery environment to provide agent interaction during item delivery. Scenario 600 focuses on drone controller 363 and aerial drone 343. At step 1, pilot 353 uses controller 363 to steer drone 343 to delivery location 601. In this case, delivery location 601 is defined as a radius around a central point, which may correspond to a map dot at a delivery address. Once drone 343 enters delivery location 601, delivery management system 301 connects delivery device 343 to client system 332 at step 2. The connection allows real-time communications to be exchanged between agent 322 and receiver 621, who is at delivery location 601, regarding an item being delivered by drone 343 to location 601. In some cases, if drone 343 needs to continue on with other deliveries, client device 332 may allow agent 322 to initiate a communication with receiver 621 via another mode of communication, such as a phone call to receiver 621's telephone. Thus, agent 322 can continue communicating with receiver 621 even after drone 343 has left location 601.

After delivering the item to location 601, pilot 353 directs drone 343 to delivery location 602 at step 3. Drone 343 may have need to go pickup an item for delivery to location 602 after delivering the item to location 601 or drone 343 may have been carrying both items when it arrived at location 601. Regardless, upon reaching location 602, drone 343 notifies delivery management system 301 that it has arrived at location 602 and system 301 connects drone 343 to client system 331 at step 4. Agent 321 therefore communicates with receiver 622 concerning the delivery of the item to location 602.

As described above with respect to operation 400, agent 321 may handle the delivery of the item to location 602 while agent 322 handled the delivery of the item to location 601 based on a schedule determined by delivery management system 301. The reason for the change in agent between the locations may be for any number of reasons. For example, when drone 343 reaches location 602, agent 322 may be unavailable because agent 322 is communicating through another drone at another location. Alternatively, the item delivered to location 601 may be within agent 322's competencies while the item delivered to location 602 is within agent 321's competencies. Regardless of which agent communicates during the two respective deliveries, pilot 353 is responsible for piloting drone 343 to each location but does not need to be trained or otherwise concern themselves with other aspects related to the delivery of the items.

Figure 7:
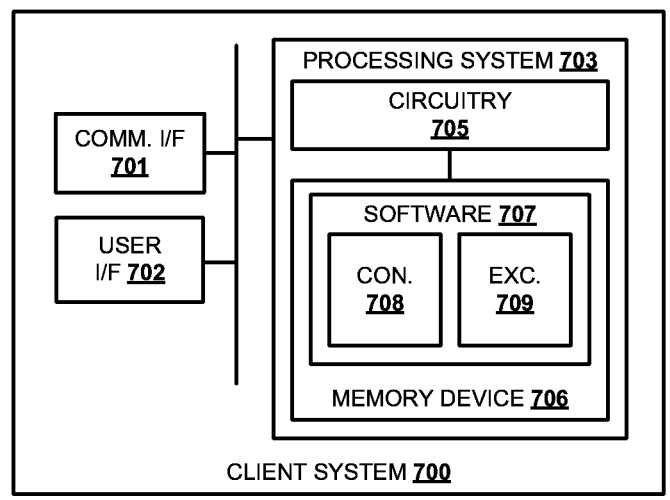
FIG. 7 illustrates a client system to provide agent interaction during item delivery.

FIG. 7 illustrates client system 700. Client system 700 is an example of client system 103, although system 103 could use alternative configurations. Client system 700 comprises wireless communication interface 701, user interface 702, and processing system 703. Processing system 703 is linked to wireless communication interface 701 and user interface 702. Processing system 703 includes processing circuitry 705 and memory device 706 that stores operating software 707. Client system 700 may include other well-known components such as a battery and enclosure that are not shown for clarity. Client system 700 may be a smartphone, tablet, computer, videoconferencing system, e-book, mobile Internet appliance, media player, game console, wireless network interface card, or some other wireless communication apparatus—including combinations thereof.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 includes connection module 708 and communication exchange module 709. Operating software 707 may further include an operating system, utilities, drivers, network interfaces, applications, or some other type of software. When executed by processing circuitry 705, operating software 707 directs processing system 703 to operate client system 700 as described herein.

In particular, connection module 707 directs processing system 703 to connect to an unmanned delivery device via communication interface 701 when the unmanned delivery device is at a first delivery location in response to a delivery management system determining that the first agent should communicate through the unmanned delivery device at the first delivery location, wherein the unmanned delivery device transports a first item for delivery to the first delivery location. Communication exchange module 709 directs processing system 703 to exchange communications for the agent via communication interface 701 with the unmanned delivery device.

Figure 8:
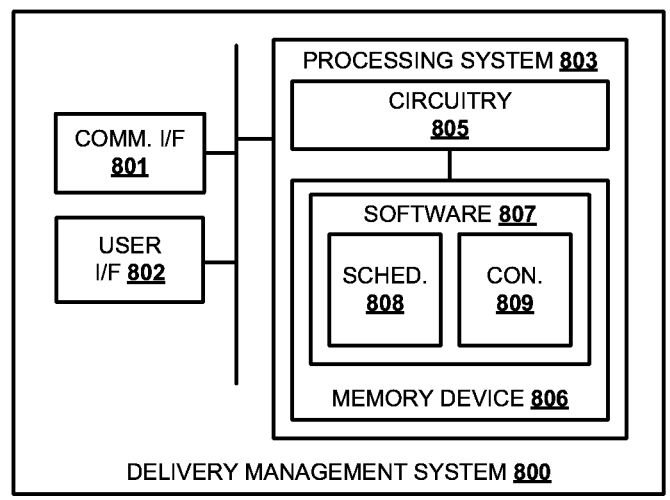
FIG. 8 illustrates a delivery management system to provide agent interaction during item delivery.

FIG. 8 illustrates delivery management system 800. Delivery management system 800 is an example of delivery management system 101, although system 101 could use alternative configurations. Delivery management system 800 comprises communication interface 801, user interface 802, and processing system 803. Processing system 803 is linked to communication interface 801 and user interface 802. Processing system 803 includes processing circuitry 805 and memory device 806 that stores operating software 807. Delivery management system 800 may include other well-known components such as a battery and enclosure that are not shown for clarity. Delivery management system 800 may be a computer, call router, application server, video-conferencing system, or some other computing apparatus—including combinations thereof.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Processing circuitry 805 is typically mounted on a circuit board that may also hold memory device 806 and portions of communication interface 801 and user interface 802. Operating software 807 comprises computer programs, firmware, or some other form of machine-readable processing instructions. Operating software 807 includes scheduling module 808 and connection module 809. Operating software 807 may further include an operating system, utilities, drivers, network interfaces, applications, or some other type of software. When executed by processing circuitry 805, operating software 807 directs processing system 803 to operate delivery management system 800 as described herein.

In particular, scheduling module 808 directs processing system 803 to determine that a first agent of a contact center should communicate through an unmanned delivery device at a first delivery location, wherein the unmanned delivery device transports a item for delivery to the first delivery location. Connection module 809 directs processing system 803 to connect a first client system operated by the first agent to the unmanned delivery device via communication interface 801 when the unmanned delivery device is at the first delivery location, wherein communications are exchanged for the agent between the first client system and the unmanned delivery device.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of facilitating an unmanned delivery service, the method comprising:

in a delivery management system remote to an unmanned delivery device:

determining that a first agent of a contact center should communicate through an unmanned delivery device at a first delivery location, wherein the unmanned delivery device transports a first item for delivery to the first delivery location;

after determining that the first agent should communicate, receiving, from the unmanned delivery device, an indication that the unmanned delivery device is at the first delivery location;

in response to receiving the indication, the delivery management system selecting the first agent from a pool of agents and connecting a first client system operated by the first agent to the unmanned delivery device; and exchanging communications for the agent between the first client system and the unmanned delivery device.

2. The method of claim 1, wherein exchanging the communications comprises:

in the first client system, receiving video captured of the first delivery location by the unmanned delivery device and displaying the video to the first agent.

3. The method of claim 1, wherein exchanging the communications comprises:

from the first client system, transferring audio captured of the first agent to the unmanned delivery device for presentation at the first delivery location by the unmanned delivery device.

4. The method of claim 3, wherein exchanging the communications further comprises:

from the first client system, transferring video captured of the first agent in conjunction with the audio to the unmanned delivery device for display at the first delivery location by the unmanned delivery device.

5. The method of claim 1, wherein exchanging the communications comprises:

in the first client system, receiving information from the unmanned delivery device and using the information to validate that a person at the first delivery location is authorized to receive the first item; and upon validating the person, transferring a signal from the first client system to the unmanned delivery device instructing the unmanned delivery device to release the first item to the person.

6. The method of claim 1, further comprising:

receiving input from the first agent into the first client system instructing that communications be exchanged between the unmanned delivery device and a second client system operated by a second agent; and
connecting the second client system to the unmanned delivery device.

7. The method of claim 1, wherein determining that the first agent of the contact center should communicate through the unmanned delivery device at the first delivery location comprises:
identifying a plurality of items, including the first item, for delivery via a plurality of unmanned delivery devices, including the first unmanned delivery device, to a plurality of delivery locations, including the first delivery location;
scheduling a plurality of agents, including the first agent, such that an agent of the plurality of agents is able to communicate at each of the plurality of delivery locations.

8. The method of claim 7, wherein the number of unmanned delivery devices in the plurality of unmanned delivery devices exceeds the number of agents in the plurality of agents and wherein scheduling the plurality of agents comprises:
distributing delivery times for each of the plurality of items such that the number of items being delivered by the plurality of unmanned delivery devices at any one time does not exceed the number of agents in the plurality of agents.

9. The method of claim 1, wherein selecting the first agent from a pool of agents comprises:
selecting the first agent from one or more agents in the pool of agents that have skill sets corresponding to the first item.

10. The method of claim 1, further comprising:
when the first agent determines that no person is at the first delivery location, allowing the unmanned delivery device to move on from the first location.

11. A client system operated by a first agent of a contact center for an unmanned delivery service, the client system comprising:
a communication interface configured to connect to an unmanned delivery device when the unmanned delivery device indicates to a delivery management system, after the delivery management system has determined that the first agent should communicate through the unmanned delivery device at a first delivery location, that the unmanned delivery device is at the first delivery location, which causes the delivery management system to select the first agent from a pool of agents, wherein the unmanned delivery device transports a first item for delivery to the first delivery location;
the communication interface further configured to exchange communications for the agent with the unmanned delivery device.

12. The client system of claim 11, wherein the communication interface configured to exchange the communications comprises the communication interface configured to receive video captured of the first delivery location by the unmanned delivery device and the client system further comprising:
a user interface configured to display the video to the first agent.

13. The client system of claim 11, wherein the communication interface configured to exchange the communications comprises:
the communication interface configured to transfer audio captured of the first agent to the unmanned delivery device for presentation at the first delivery location by the unmanned delivery device.

14. The client system of claim 13, wherein the communication interface configured to exchange the communications further comprises:
the communication interface configured to transfer video captured of the first agent in conjunction with the audio to the unmanned delivery device for display at the first delivery location by the unmanned delivery device.

15. The client system of claim 11, wherein the communication interface configured to exchange the communications comprises:
the communication interface configured to receive information from the unmanned delivery device and using the information to validate that a person at the first delivery location is authorized to receive the first item and, upon the person being validated, transfer a signal from the first client to the unmanned delivery device instructing the unmanned delivery device to release the first item to the person.

16. The client system of claim 11, further comprising:
a user interface configured to receive input from the first agent instructing that communications be exchanged between the unmanned delivery device and a second client system operated by a second agent, wherein the second client is connected to the unmanned delivery device.

17. A delivery management system for facilitating an unmanned delivery service, the delivery management system comprising:
a processing system configured to determine that a first agent of a contact center should communicate through an unmanned delivery device at a first delivery location, wherein the unmanned delivery device transports a first item for delivery to the first delivery location, and select the first agent from a pool of agents in response to an indication, from the unmanned delivery device, that the unmanned delivery device is at the first delivery location;
a communication interface configured to, after the processing system determines that the first agent should communicate, receive the indication and connect a first client system operated by the first agent to the unmanned delivery device in response to the indication, wherein communications are exchanged for the agent between the first client system and the unmanned delivery device.

18. The delivery management system of claim 17, wherein input is received from the first agent into the first client system instructing that communications be exchanged between the unmanned delivery device and a second client system operated by a second agent, and the delivery management system further comprising:
the communication interface configured to connect the second client system to the unmanned delivery device.

19. The delivery management system of claim 17, wherein the processing system configured to determine that the first agent of the contact center should communicate through the unmanned delivery device at the first delivery location comprises:
the processing system configured to identify a plurality of items, including the first item, for delivery via a plurality of unmanned delivery devices, including the first unmanned delivery device, to a plurality of delivery locations, including the first delivery location, and schedule a plurality of agents, including the first agent, such that an agent of the plurality of agents is able to communicate at each of the plurality of delivery locations.

20. The delivery management system of claim 19, wherein the number of unmanned delivery devices in the plurality of unmanned delivery devices exceeds the number of agents in the plurality of agents and wherein the processing system configured to schedule the plurality of agents comprises:

the processing system configured to distribute delivery times for each of the plurality of items such that the number of items being delivered by the plurality of unmanned delivery devices at any one time does not exceed the number of agents in the plurality of agents.

\* \* \* \* \*